UNITED STATES PATENT OFFICE.

ERNEST HENRY JONES, OF ISLINGTON, LONDON, ENGLAND.

MANUFACTURE OF ELECTRODES FOR SOLDERING AND DEPOSITING METALS BY THE ELECTRIC ARC.

1,339,515.     Specification of Letters Patent.     Patented May 11, 1920.

No Drawing.     Application filed February 18, 1920. Serial No. 359,659.

*To all whom it may concern:*

Be it known that I, ERNEST HENRY JONES, subject of the King of Great Britain, residing at 18 and 20 Church street, Islington, London, England, have invented new and useful Improvements in the Manufacture of Electrodes for Soldering and Depositing Metals by the Electric Arc, of which the following is a specification.

This invention relates to electrodes for soldering and depositing metals by the electric arc which are manufactured of metal wire or rod covered with a slag-forming material.

It has been proposed to add to the slag-forming material a suitable chemical substance in order to produce a compound of the nature of cement which sets hard on drying; but in practice, and when covering wire or rods by an extruding process, the cement gradually sets in the extruding machine and renders the extrusion thereof difficult and unsatisfactory.

According to this invention, one of the materials or substances which acts with the other or others to form the cement is withheld from the fluid compound and instead of being mixed therewith is applied by itself to the metal wire or rod; and it may be allowed to dry thereon so that the prepared wires or rods may be stored ready to receive the covering of fluid compound as required. When the compound is applied to the prepared wires or rods, chemical action commences and proceeds gradually to set the compound.

It is found that electrodes manufactured in this manner will withstand transport without damage for a considerable period, and may even become bent without detaching the compound from the wire or rod.

As an example of manufacture, the wire or rod is wound with asbestos yarn in open spirals and then coated with a siliceous compound, preferably silicate of soda, and allowed to dry if not required for immediate use: the fluid mixture or compound is made up with a suitable proportion of lime, fluor spar, magnesite, dolomite, or the like and stored in a fluid form ready for use. For covering the prepared wires or rods, the fluid compound is extruded upon the prepared asbestos-wound wire or rod and allowed to harden. A suitable fluid mixture or compound may be composed of fluor spar 1 part, carbonate of soda 1 part, and lime about 4 parts.

In some cases the fluid compound may be in the form of a fine powder, which adheres to the moist or moistened silica on the wire or rod, the moisture being sufficient to render the ingredients chemically active with the silica.

When powdered aluminium is to be added to the covering it is mixed with the fluid compound in order to minimize or prevent the effervescence created by the action of a silicate of soda on the aluminium when mixed together. Silicate of potash or other suitable siliceous compounds may be used instead of or mixed with silicate of soda.

I claim:—

1. The process of forming an electrode, which consists in coating a rod with silica, moistening said coating, and applying a slag-forming powder thereto while the silica is in moist condition.

2. The process of forming an electrode, which consists in applying to a rod an element of a slag-forming compound, and then applying another element of such compound, one of said elements containing powdered aluminium.

In testimony whereof I have signed my name to this specification.

ERNEST HENRY JONES.